(12) United States Patent
Tsuchida

(10) Patent No.: US 8,988,424 B2
(45) Date of Patent: Mar. 24, 2015

(54) IMAGE PROCESSING APPARATUS, IMAGE PROCESSING METHOD, AND PROGRAM FOR GENERATING MULTI-VIEWPOINT IMAGES

(75) Inventor: Yuji Tsuchida, Kanagawa (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 13/548,867

(22) Filed: Jul. 13, 2012

(65) Prior Publication Data

US 2013/0021333 A1    Jan. 24, 2013

(30) Foreign Application Priority Data

Jul. 21, 2011  (JP) .................................. 2011-159485

(51) Int. Cl.
*G06T 15/00* (2011.01)
*H04N 13/00* (2006.01)
*H04N 13/02* (2006.01)

(52) U.S. Cl.
CPC ....... *H04N 13/0011* (2013.01); *H04N 13/0282* (2013.01)
USPC .......................................... 345/419; 345/420

(58) Field of Classification Search
None
See application file for complete search history.

(56) References Cited

U.S. PATENT DOCUMENTS

| 4,562,463 | A | * | 12/1985 | Lipton | ............................ 348/56 |
| 5,850,352 | A | * | 12/1998 | Moezzi et al. | ................ 345/419 |
| 7,680,322 | B2 | * | 3/2010 | Tooyama et al. | ............. 382/154 |
| 2010/0215251 | A1 | * | 8/2010 | Klein Gunnewiek et al. | ............................ 382/154 |

FOREIGN PATENT DOCUMENTS

JP    2010-063083    3/2010

* cited by examiner

*Primary Examiner* — Said Broome
(74) *Attorney, Agent, or Firm* — Sherr & Jiang, PLLC

(57) ABSTRACT

There is provided an image processing apparatus. The image processing apparatus generates a plurality of viewpoint images from an input image signal formed by a two-dimensional image signal such that a signal difference between viewpoints is a predetermined value, and both of two viewpoint images where the signal difference between viewpoints is equal to twice the predetermined value form a left eye image and a right eye image for realizing three-dimensional stereoscopic vision.

5 Claims, 12 Drawing Sheets

IMAGE PROCESSING APPARATUS, IMAGE PROCESSING METHOD, AND PROGRAM FOR GENERATING MULTI-VIEWPOINT IMAGES

BACKGROUND

The present disclosure relates to an image processing apparatus, an image processing method, and a program. In particular, the present disclosure relates to an image processing apparatus, an image processing method, and a program, capable of generating multi-viewpoint images which can realize naked-eye three-dimensional stereoscopic vision by multiple viewpoints from an input image formed by a two-dimensional image in a simple way.

In the related art, a technique for generating two stereoscopic images where stereoscopic vision is achievable from a single image has been proposed (see JP-A-2010-63083).

According to the technique proposed in JP-A-2010-63083, nonlinear transformation is performed for a feature amount signal extracted from an input image using a simple differential filter or the like so as to generate an enhancement signal, and a right eye image and a left eye image where stereoscopic vision is achievable can be generated by adding and subtracting the enhancement signal to and from the input signal.

SUMMARY

However, since only two kinds of images, a right eye image and a left eye image, are generated by the above-described method, it is not possible to generate multi-viewpoint images which are necessary as input signals of a multi-viewpoint display device represented by a naked-eye stereoscopic vision image display device such as, for example, a lenticular lens type or parallax barrier type device.

The present disclosure has been made in consideration of these circumstances, and, particularly, provides a technical capable of appropriately generating naked-eye three-dimensional stereoscopic vision images of multiple viewpoints from an input image formed by a two-dimensional image in a simple way.

According to an embodiment of the present disclosure, there is provided an image processing apparatus which generates a plurality of viewpoint images from an input image signal formed by a two-dimensional image signal such that a signal difference between viewpoints is a predetermined value, and both of two viewpoint images where the signal difference between viewpoints is equal to twice the predetermined value form a left eye image and a right eye image for realizing three-dimensional stereoscopic vision.

According to an embodiment of the present disclosure, there is provided an image processing apparatus which includes a plurality of extraction units, a plurality of enhancement processing units, and a plurality of first image generation units. The plurality of extraction units extract a plurality of spatial feature amount signals of an input image signal formed by a two-dimensional image signal. The plurality of enhancement processing units perform an enhancement process for each of the plurality of feature amount signals and generate a plurality of enhancement signals. The plurality of first image generation units generate a first viewpoint image for each of the plurality of enhancement signals by adding the plurality of enhancement signals to the input image signal. The plurality of extraction units extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

The image processing apparatus according to the embodiment of the present disclosure may further include a plurality of second image generation units that generate a second viewpoint signal for each of the plurality of enhancement signals by subtracting the plurality of enhancement signals from the input image signal. Here, the plurality of extraction units may extract a plurality of spatial feature amounts of the input image signal formed by a two-dimensional image signal such that a signal difference between viewpoints of viewpoint images which are obtained in order of magnitude of addition values of the enhancement signals added to or subtracted from the input image signal is a predetermined value, and both of two viewpoint images where the signal difference between viewpoints is equal to twice the predetermined value form a left eye image and a right eye image for realizing three-dimensional stereoscopic vision.

In the image processing apparatus according to the embodiment of the present disclosure, when the input image signal is sequentially supplied in units of pixels consecutively adjacent in a predetermined direction, the first image generation units may generate the first viewpoint image by adding the enhancement signal to the input image signal of a present pixel.

According to an embodiment of the present disclosure, there is provided an image processing method which includes extracting, by a plurality of extraction units that extract a spatial feature amount signals of an input image signal formed by a two-dimensional image signal, the plurality of spatial feature amount signals of the input image signal formed by a two-dimensional image signal, the extracting being performed a plurality of times, performing, by a plurality of enhancement processing units that generate a plurality of enhancement signals by performing an enhancement process for each of a plurality of feature amount signals, an enhancement process for each of the plurality of feature amount signals and generating the plurality of enhancement signals, the enhancement process being performed a plurality of times, and generating, by a plurality of first image generation units that generate a first viewpoint image for each of the plurality of enhancement signals by adding the plurality of enhancement signals to the input image signal, the first viewpoint image for each of the plurality of enhancement signals by adding the plurality of enhancement signals to the input image signal, the generating being performed a plurality of times. The extracting is performed by causing the plurality of extraction units to extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

According to an embodiment of the present disclosure, there is provided a program enabling a computer to control an image processing apparatus. The image processing apparatus includes a plurality of extraction units that extract a plurality of spatial feature amount signals of an input image signal formed by a two-dimensional image signal, a plurality of enhancement processing units that perform an enhancement process for each of the plurality of feature amount signals and generate a plurality of enhancement signals, and a plurality of first image generation units that generate a first viewpoint image for each of the plurality of enhancement signals by adding the plurality of enhancement signals to the input image signal. The plurality of extraction units extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision. The program enables the computer to execute operations including extracting, by the plurality of extraction units, the plurality of spatial feature amount signals of the input image signal formed by a two-dimensional image signal, the extracting being performed a plurality of times, performing, by the plurality of enhancement processing units, the enhancement process for each of the plurality of feature amount signals and generating the plurality of enhancement signals, the enhancement process being performed a plurality of times, and generating, by the plurality of first image generation units, the first viewpoint image for each of the plurality of enhancement signals by adding the plurality of enhancement signals to the input image signal, the generating being performed a plurality of times. The extracting is performed by causing the plurality of extraction units to extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

In the image processing apparatus according to the embodiment of the present disclosure, a plurality of viewpoint images may be generated from an input image signal formed by a two-dimensional image signal such that a signal difference between viewpoints is a predetermined value, and both of two viewpoint images where the signal difference between viewpoints is equal to twice the predetermined value form a left eye image and a right eye image for realizing three-dimensional stereoscopic vision.

In the image processing apparatus according to the embodiment of the present disclosure, a plurality of spatial feature amount signals of an input image signal formed by a two-dimensional image signal may be extracted, and a plurality of enhancement signals may be generated by performing an enhancement process for each of the plurality of feature amount signals, and a first viewpoint image may be generated for each of the plurality of enhancement signals by adding the plurality of enhancement signals to the input image signal. In the image processing apparatus, a plurality of spatial feature amounts of the input image signal formed by a two-dimensional image signal may be extracted such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

The image processing apparatus according to the embodiments of the present disclosure may be a stand-alone device or may be configured as a block for performing an imaging process.

According to the embodiments of the present disclosure, it is possible to generate multi-viewpoint three-dimensional stereoscopic vision images by the naked-eye from a two-dimensional input image in a simple way.

DETAILED DESCRIPTION OF THE EMBODIMENT(S)

Figure 1:
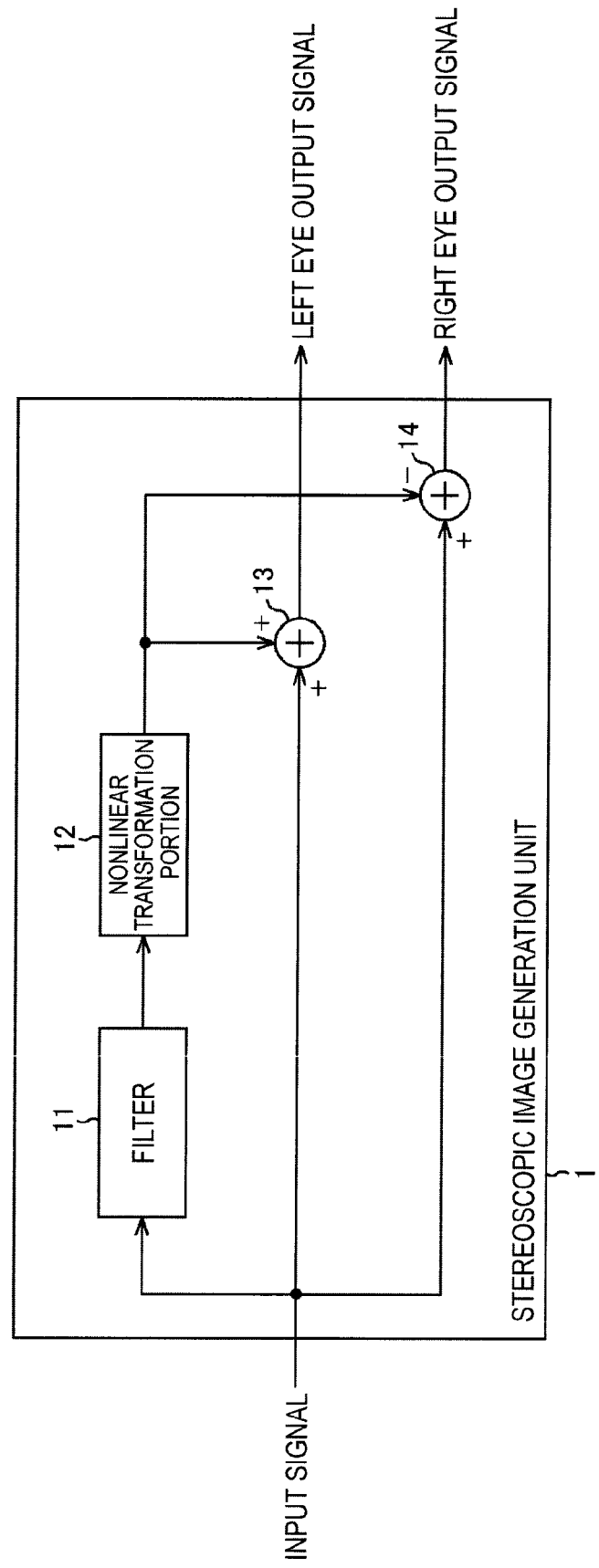
FIG. 1 is a diagram illustrating a configuration of a stereoscopic image generation unit in the related art.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure will be described. In addition, the description will be made in the following order.

1. First Embodiment

2. Second Embodiment (a configuration example of the case where a single filter coefficient sequence does not form odd symmetry with respect to a central coefficient value thereof)

1. First Embodiment

Three-Dimensional Stereoscopic Vision Images by the Naked Eye in the Related Art Before describing a multi-viewpoint image generation unit which generates three-dimensional stereoscopic vision images by the naked eye according to an embodiment of the present disclosure, a principle of generating three-dimensional stereoscopic vision images disclosed in JP-A-2010-63083 will be described.

FIG. 1 shows a configuration of a stereoscopic image generation unit 1 in the related art which generates three-dimensional stereoscopic vision images by the naked eye from an input image formed by a two-dimensional image.

The stereoscopic image generation unit 1 includes a filter 11, a nonlinear transformation portion 12, an adder 13, and a subtractor 14. The filter 11 performs a differential filter process for an input image formed by a two-dimensional image so as to extract a feature amount signal. The nonlinear transformation portion 12 outputs an enhancement signal by nonlinearly transforming the feature amount signal. The adder 13 adds the enhancement signal to the input image so as to output a left eye image signal. The subtractor 14 subtracts the enhancement signal from the input image so as to output a right eye image signal.

If a right eye image and a left eye image obtained based on the right eye image signal and the left eye image signal are to be viewed in stereoscopic vision, a necessary condition may be that there is a signal difference suitable for stereoscopic vision between the right eye image and the left eye image. Hereinafter, the signal difference between the right eye image and the left eye image is referred to as a signal difference between left and right viewpoints.

Figure 2:
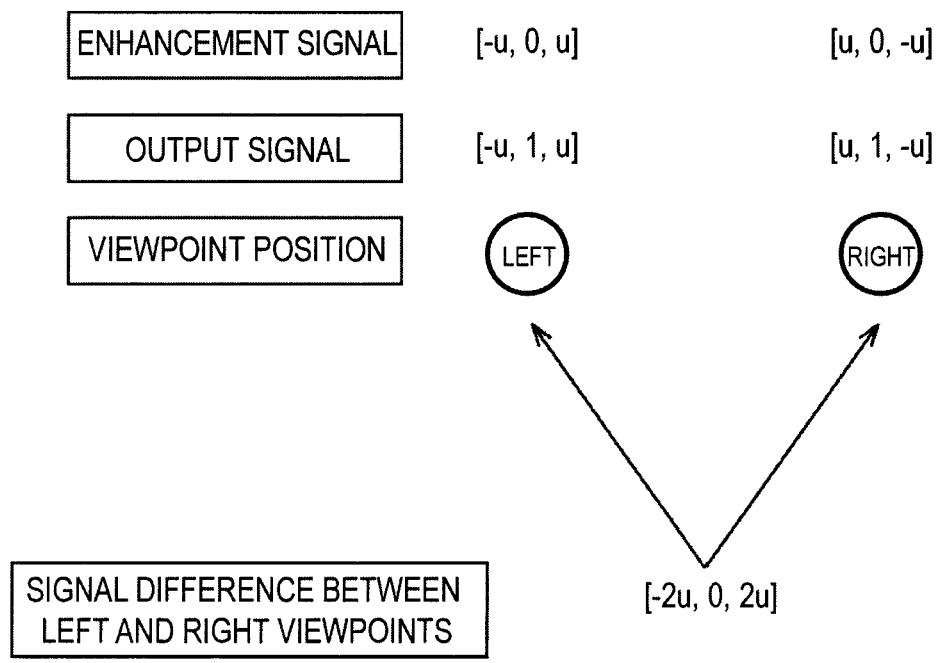
FIG. 2 is a diagram illustrating a stereoscopic image generation process in the related art.

In a case where the filter 11 processes, for example, a target pixel using linear sum obtained by respectively multiplying three pixels including pixels adjacent thereto leftward and rightward by a coefficient [−1,0,1], a feature amount signal is assumed to be expressed as [−1,0,1]. In addition, it is assumed that output signals by the nonlinear transformation portion 12 are expressed as 1u, 2u, 3u, 4u, and so on, when input signals are 1, 2, 3, 4, and so on. Further, a relationship between the input signal and the output signal in the nonlinear transformation portion 12 will be described later in detail. In this case, an enhancement signal corresponding to each pixel of an input image is expressed as [−u,0,u] for a left eye image and is expressed as [u,0,−u] for a right eye image, as shown in FIG. 2. Therefore, as shown in FIG. 2, a left eye output signal is expressed as [−u,1,u], and a right eye output signal is expressed as [u,1,−u]. As a result, the signal difference between left and right viewpoints is expressed as [−2u,0,2u] by subtracting the right eye output signal from the left eye output signal.

In other words, when the signal difference between left and right viewpoints expressed as such is appropriately set to [−2u,0,2u], it is possible to generate a left eye output signal and a right eye output signal where three-dimensional stereoscopic vision by the naked-eye is achievable from a two-dimensional image.

However, as described above, in the method disclosed in JP-A-2010-63083, since only two kinds of images, a right eye image and a left eye image, are generated, it is not possible to generate multi-viewpoint images which are necessary as input signals of a multi-viewpoint display device represented by a naked-eye stereoscopic vision image display device such as, for example, a lenticular lens type or parallax barrier type device.

[Configuration Example of the Multi-Viewpoint Image Generation Unit Formed from the Image Processing Apparatus According to an Embodiment of the Present Disclosure]

Therefore, a description will be made of a configuration example of the multi-viewpoint image generation unit capable of generating multi-viewpoint images which can be used for a multi-viewpoint display device represented by a naked-eye stereoscopic vision image display device such as a lenticular lens type or parallax barrier type device, with reference to FIG. 3.

Figure 3:
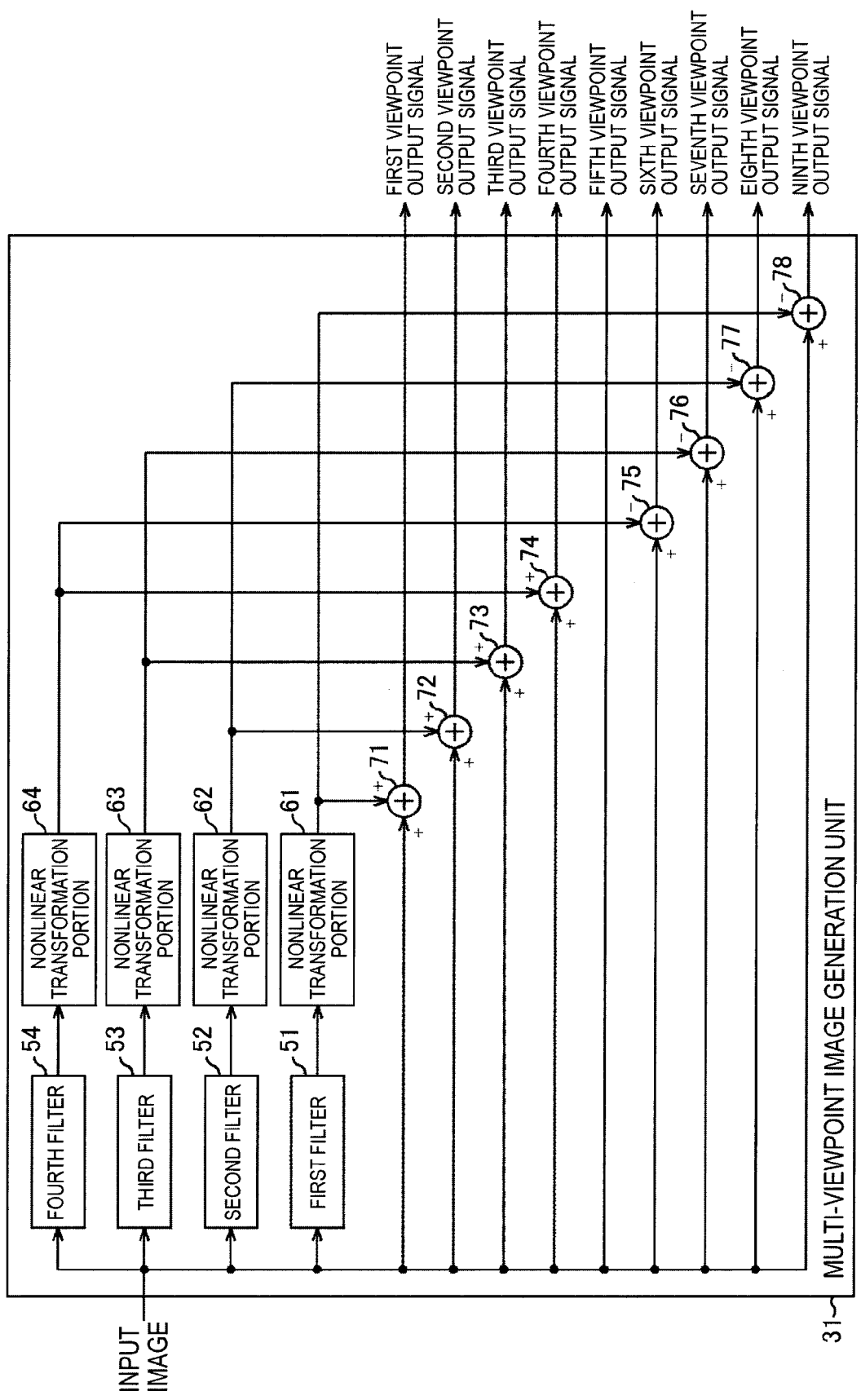
FIG. 3 is a diagram illustrating a configuration example of a multi-viewpoint image generation unit of an image processing apparatus according to a first embodiment of the present disclosure.

As shown in FIG. 3, a multi-viewpoint image generation unit 31 includes a first filter 51 to a fourth filter 54, nonlinear transformation portions 61 to 64, adders 71 to 74, and subtractors 75 to 78. The four kinds of filters, that is, the first filter 51 to the fourth filter 54 which may be FIR filters having different filter coefficients, obtain feature amount signals by performing a filter process for a two-dimensional image which is an input image, and supply the obtained feature amount signals to the corresponding one of the nonlinear transformation portions 61 to 64.

The nonlinear transformation portions 61 to 64 perform a nonlinear process of the same nonlinear characteristic for the supplied feature amount signals and then generate enhancement signals. The nonlinear transformation portion 61 supplies the generated enhancement signal to the adder 71 and the subtractor 78. The nonlinear transformation portion 62 supplies the generated enhancement signal to the adder 72 and the subtractor 77. The nonlinear transformation portion 63 supplies the generated enhancement signal to the adder 73 and the subtractor 76. The nonlinear transformation portion 64 supplies the generated enhancement signal to the adder 74 and the subtractor 75.

The adders 71 to 74 respectively add the supplied enhancement signals to the input image and then output first to fourth viewpoint output signals. The subtractors 75 to 78 respectively subtract the supplied enhancement signals from the input image and then output sixth to ninth viewpoint output signals. In addition, the input image is output as a fifth viewpoint output signal without modification.

In other words, the multi-viewpoint image generation unit 31 generates the nine kinds of first to ninth viewpoint output signals each having different viewpoints from the input image formed by a single two-dimensional image.

[Filter Coefficients of the First Filter to the Fourth Filter of the Multi-Viewpoint Image Generation Unit of FIG. 3]

Figure 4:
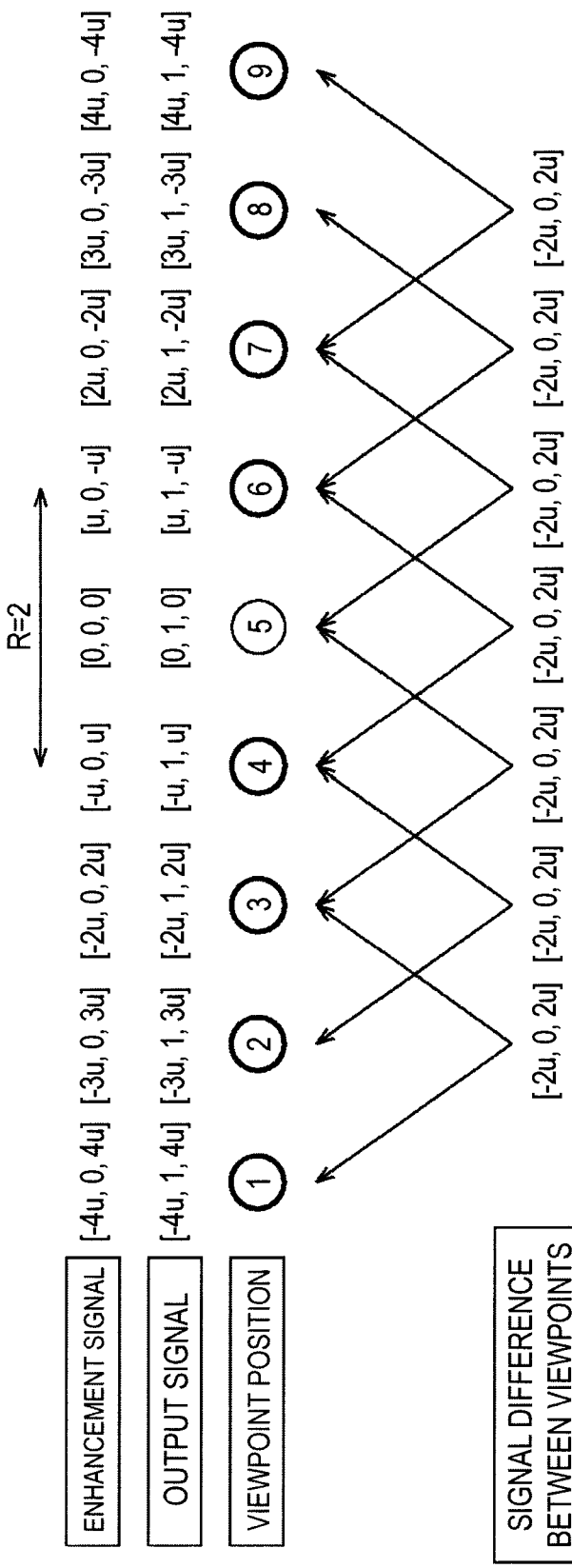
FIG. 4 is a diagram illustrating a multi-viewpoint image generation process performed by the multi-viewpoint image generation unit of FIG. 3.

Next, with reference to FIG. 4, filter coefficients of the first filter 51 to the fourth filter 54 will be described. In addition, the respective viewpoints correspond to positions corresponding to numbers denoted in the circles of FIG. 4, and are referred to as viewpoint 1 to viewpoint 9. It is assumed that, when a distance R between adjacent viewpoints is 1, a left eye image signal and a right eye image signal set as images where naked-eye three-dimensional stereoscopic vision is possible for the respective viewpoints are two-viewpoint output signals where a distance between viewpoints adjacent to an image set at a position corresponding to an input image of each viewpoint is 2.

In other words, an output signal corresponding to an input image at the viewpoint 5 is the fifth viewpoint output signal set at a position of the viewpoint 5. In addition, a left eye image signal and a right eye image signal at the viewpoint 5 are respectively the fourth viewpoint output signal and the sixth viewpoint output signal. Similarly, an output signal corresponding to an input image at the viewpoint 4 is the fourth viewpoint output signal set at a position of the viewpoint 4. In addition, a left eye image signal and a right eye image signal at the viewpoint 4 are respectively the third viewpoint output signal and the fifth viewpoint output signal. Further, an output signal corresponding to an input image at the viewpoint 3 is the third viewpoint output signal set at a position of the viewpoint 3. In addition, a left eye image signal and a right eye image signal at the viewpoint 3 are respectively the second viewpoint output signal and the fourth viewpoint output signal. Moreover, an output signal corresponding to an input image at the viewpoint 2 is the second viewpoint output signal set at a position of the viewpoint 2. In addition, a left eye image signal and a right eye image signal at the viewpoint 2 are respectively the first viewpoint output signal and the third viewpoint output signal.

In addition, an output signal corresponding to an input image at the viewpoint 6 is the sixth viewpoint output signal set at a position of the viewpoint 6. Further, a left eye image signal and a right eye image signal at the viewpoint 6 are respectively the fifth viewpoint output signal and the seventh viewpoint output signal. In addition, an output signal corresponding to an input image at the viewpoint 7 is the seventh viewpoint output signal set at a position of the viewpoint 7. Further, a left eye image signal and a right eye image signal at the viewpoint 7 are respectively the sixth viewpoint output signal and the eighth viewpoint output signal. In addition, an output signal corresponding to an input image at the viewpoint 8 is the eighth viewpoint output signal set at a position of the viewpoint 8. Further, a left eye image signal and a right eye image signal at the viewpoint 8 are respectively the seventh viewpoint output signal and the ninth viewpoint output signal.

Furthermore, an output signal at a viewpoint a is denoted by $C\_a$, and a difference between an output signal at the viewpoint a and an output signal at the viewpoint b is denoted by $D\_{ab}$.

In other words, a left eye image signal and a right eye image signal at each viewpoint are based on the assumption that all aim at realizing naked-eye three-dimensional stereoscopic vision, and thus signal differences between viewpoints of the left eye image signal and the right eye image signal at each viewpoint are the same. Therefore, filter coefficients of the first filter 51 to the fourth filter 54 are set such that the respective signal differences between viewpoints are the same.

Thus, filter coefficients of the first filter 51 to the fourth filter 54 may be considered on the basis of a constraint condition that the signal differences between viewpoints are the same.

For example, in a case where the first filter 51 which generates feature amount signals of the viewpoints 4 to 6 uses a 3-tap FIR filter having a tap coefficient $[-1,0,1]$ as a filter coefficient and when inputs are 1, 2, 3, 4, ..., the outputs by nonlinear transformation are u, 2u, 3u, 4u, ..., the output signals $C\_4$ to $C\_6$ at the viewpoints 4 to 6 for the unit input 1 are expressed by the following Equations (1) to (3).

$$C\_4=[-u,1,u] \quad (1)$$

$$C\_5=[0,1,0] \quad (2)$$

$$C\_6=[u,1,-u] \quad (3)$$

Therefore, filter coefficients for generating output signals $C\_1$ to $C\_3$ and $C\_7$ to $C\_9$ at the viewpoints 1 to 3 and viewpoints 7 to 9, respectively, are obtained according to the following procedures. Here, u is a value generated by the nonlinear transformation, and details thereof will be described later.

In other words, a difference $D\_{46}$ between the output signal at the viewpoint 4 and the output signal at the viewpoint 6 is equal to a difference between the output signal $C\_4$ at the viewpoint 4 and the output signal $C\_6$ at the viewpoint 6, and thus the difference $D\_{46}$ is expressed as indicated in the following Equation (4).

$$D\_46=C\_4-C\_6=[-u,1,u]-[u,1,-u]=[-2u,0,2u] \quad (4)$$

A difference $D\_{35}$ between the output signal $C\_3$ at the viewpoint 3 and the output signal $C\_5$ at the viewpoint 5 is equal to the difference $D\_{46}$ on the basis of the constraint condition, and thus a relationship of the following Equation (5) is established.

$$D\_35=C\_3-C\_5=D\_46 \quad (5)$$

If Equation (5) is rewritten as the following Equation (6), then the output signal $C\_3$ at the viewpoint 3 is obtained.

$$C\_3=D\_46+C\_5=[-2u,0,2u]+[0,1,0]=[-2u,1,2u] \quad (6)$$

In addition, a difference $D\_{24}$ between the output signal $C\_2$ at the viewpoint 2 and the output signal $C\_4$ at the viewpoint 4 is equal to the difference $D\_{46}$ on the basis of the constraint condition, and thus a relationship of the following Equation (7) is established.

$$D\_24=C\_2-C\_4=D\_46 \quad (7)$$

If Equation (7) is rewritten as the following Equation (8), then the output signal $C\_2$ at the viewpoint 2 is obtained.

$$C\_2=D\_46+C\_4=[-2u,0,2u]+[-u,1,u]=[-3u,1,3u] \quad (8)$$

In addition, a difference $D\_{13}$ between the output signal $C\_1$ at the viewpoint 1 and the output signal $C\_3$ at the viewpoint 3 is equal to the difference $D\_{46}$ on the basis of the constraint condition, and thus a relationship of the following Equation (9) is established.

$$D\_13=C\_1-C\_3=D\_46 \quad (9)$$

If Equation (9) is rewritten as the following Equation (10), then the output signal $C\_1$ at the viewpoint 1 is obtained.

$$C\_1=D\_46+C\_3=[-2u,0,2u]+[-2u,1,2u]= [-4u,1,4u] \quad (10)$$

In addition, a difference $D\_{57}$ between the output signal $C\_5$ at the viewpoint 5 and the output signal $C\_7$ at the viewpoint 7 is equal to the difference $D\_{46}$ on the basis of the constraint condition, and thus a relationship of the following Equation (11) is established.

$$D\_57=C\_5-C\_7=D\_46 \quad (11)$$

If Equation (11) is rewritten as the following Equation (12), then the output signal $C\_7$ at the viewpoint 7 is obtained.

$$C\_7=C\_5-D\_46=[0,1,0]-[-2u,0,2u]=[2u,1,-2u] \quad (12)$$

In addition, a difference $D\_{68}$ between the output signal $C\_6$ at the viewpoint 6 and the output signal $C\_8$ at the viewpoint 8 is equal to the difference $D\_{46}$ on the basis of the constraint condition, and thus a relationship of the following Equation (13) is established.

$$D\_68=C\_6-C\_8=D\_46 \quad (13)$$

If Equation (13) is rewritten as the following Equation (14), then the output signal $C\_8$ at the viewpoint 8 is obtained.

$$C\_8=C\_6-D\_46=[u,1,-u]-[-2u,0,2u]=[3u,1,-3u] \quad (14)$$

In addition, a difference $D\_{79}$ between the output signal $C\_7$ at the viewpoint 7 and the output signal $C\_9$ at the viewpoint 9 is equal to the difference $D\_{46}$ on the basis of the constraint condition, and thus a relationship of the following Equation (15) is established.

$$D\_79=C\_7-C\_9=D\_46 \quad (15)$$

If Equation (15) is rewritten as the following Equation (16), then the output signal C_9 at the viewpoint 9 is obtained.

$$C\_9 = C\_7 - D\_46 = [2u, 1, -2u] - [-2u, 0, 2u] = [4u, 1, -4u] \quad (16)$$

The output signals C_1 to C_9 at the respective viewpoints is performed with the same nonlinear transformation in the nonlinear transformation portions 61 to 64 and then the output signals are values obtained by adding the input signal thereto, and thus the filter coefficients are obtained by subtracting the input signal from the output signals C_1 to C_9 and by performing inverse nonlinear transformation.

Figure 5:
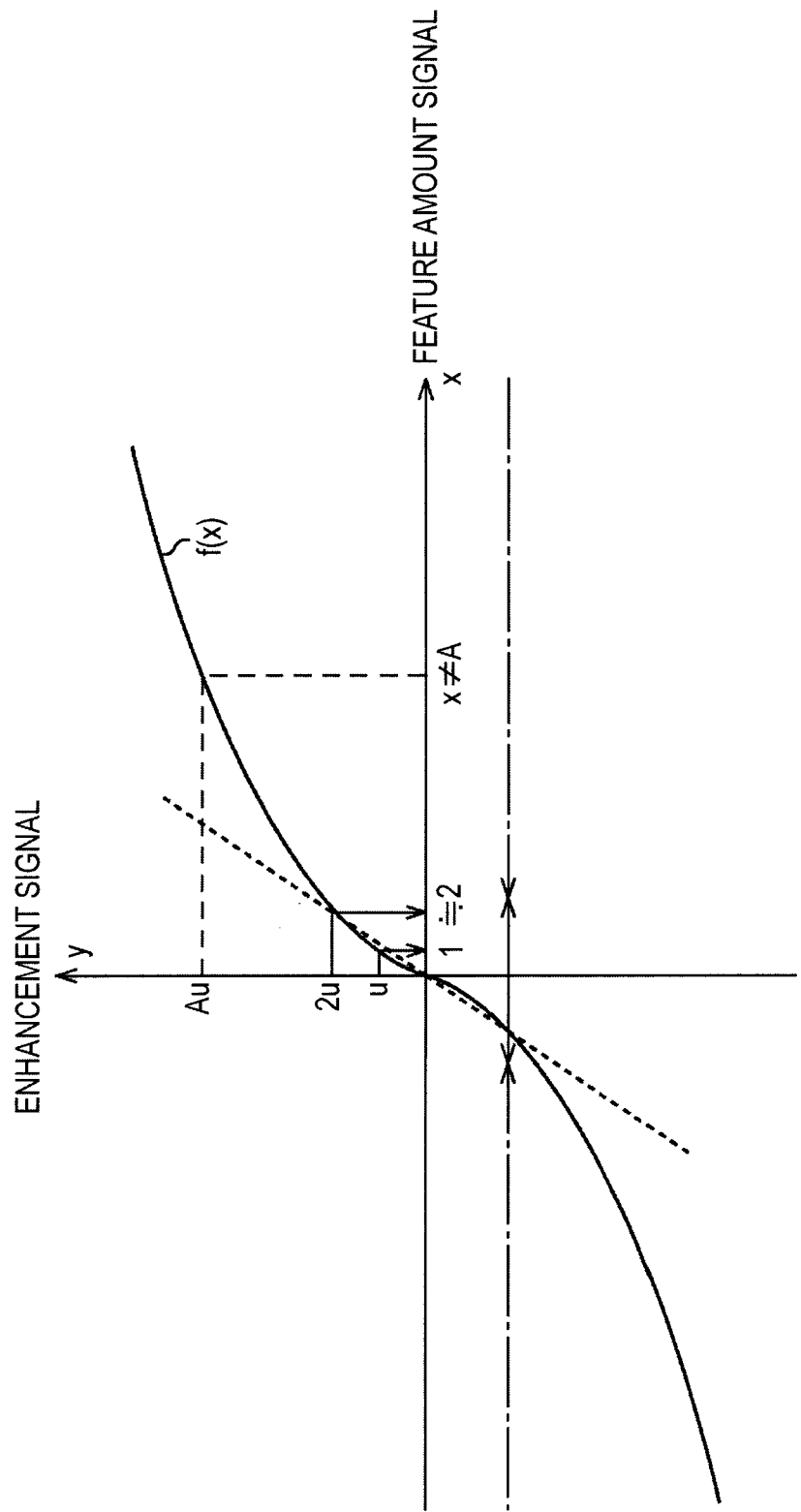
FIG. 5 is a diagram illustrating a nonlinear transformation proces.

In addition, since the amplitude of an enhancement signal having a stereoscopic effect is mainly in a low level, the nonlinear transformation and inverse nonlinear transformation in this region can be approximated to linear transformation. In other words, for example, if the function y=f(x) used for the nonlinear transformation by the nonlinear transformation portions 61 to 64 is a function defined by the curve as shown in FIG. 5, for example, in a case of the output y=f(x)=Au in a range where the amplitude of the enhancement signal is large, indicated by the alternate long and short dash line arrow in the figure, the input is nonlinear, which thus does not lead to x=A. However, when the amplitude is in a low level and is located around the origin such as a range indicated by the solid line arrow in the figure, the nonlinear function can be approximated to linear function, and thus, when the output y=u or 2u, the corresponding input may be substantially 1 or 2.

In other words, if an input to the nonlinear transformation portions 61 to 64 is x, an output from the nonlinear transformation portions 61 to 64 is y, a function used for the nonlinear transformation by the nonlinear transformation portions 61 to 64 is y=f(x), and a function used for the inverse nonlinear transformation is defined as x=f'(y), then equations related to the nonlinear transformation are indicated by the following Equations (17) to (20) when the input x is 1, 2, 3 and 4.

$$u = f(1) \quad (17)$$

$$2u = f(2) \quad (18)$$

$$3u = f(3) \quad (19)$$

$$4u = f(4) \quad (20)$$

Therefore, equations related to the inverse nonlinear transformation are indicated by the following Equations (21) to (24).

$$1 = f'(u) \quad (21)$$

$$2 = f'(2u) \quad (22)$$

$$3 = f'(3u) \quad (23)$$

$$4 = f'(4u) \quad (24)$$

For this reason, filter coefficients of the first filter 51 to the fourth filter 54 are obtained as in the following Equations (25) to (28).

$$\text{Filter coefficient of the first filter } 51 = [-4, 0, 4] \quad (25)$$

$$\text{Filter coefficient of the second filter } 52 = [-3, 0, 3] \quad (26)$$

$$\text{Filter coefficient of the third filter } 53 = [-2, 0, 2] \quad (26)$$

$$\text{Filter coefficient of the fourth filter } 54 = [-1, 0, 1] \quad (27)$$

As a result, it can be seen that the filter coefficients substantially form odd symmetry with respect to the fifth viewpoint output signal in the first viewpoint output signal to the ninth viewpoint output signal. As described above, by setting filter coefficients such that a signal difference between viewpoints is typically constant, it is possible to generate multi-viewpoint images where typically optimal naked-eye three-dimensional stereoscopic vision is possible at any viewpoint. In addition, needless to say, the filter coefficients may be other filter coefficients as long as the constraint condition set by a distance between adjacent viewpoints is satisfied.

[Multi-Viewpoint Image Generation Process Performed by Multi-Viewpoint Image Generation Unit of FIG. 3]

Figure 6:
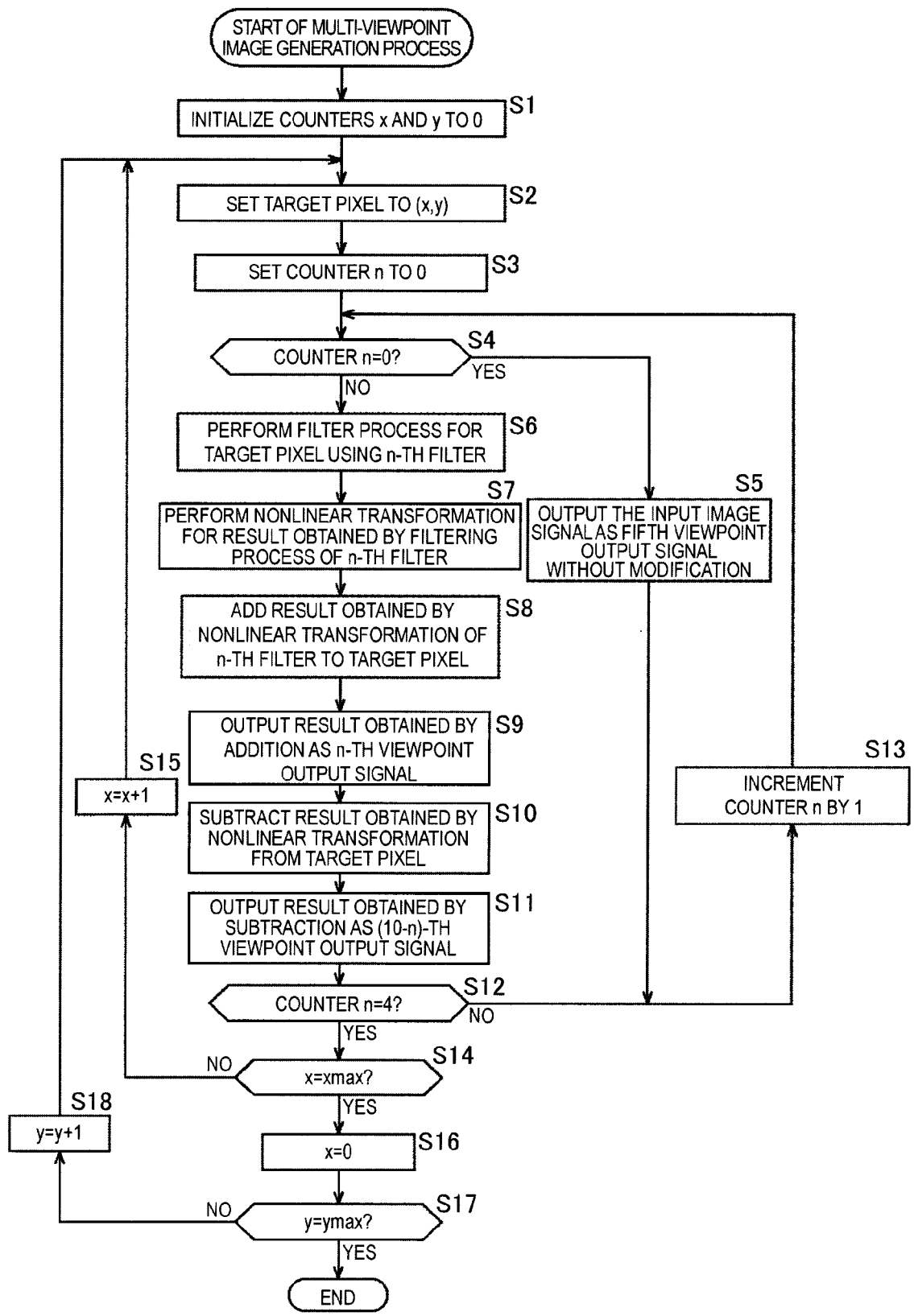
FIG. 6 is a flowchart illustrating a multi-viewpoint image generation process performed by the multi-viewpoint image generation unit of FIG. 3.

Next, a multi-viewpoint image generation process performed by the multi-viewpoint image generation unit 31 of FIG. 3 will be described with reference to a flowchart of FIG. 6.

In step S1, the multi-viewpoint image generation unit 31 initializes counters x and y (not shown) to zero (0), and the counters x and y are used to manage pixel positions.

In step S2, the multi-viewpoint image generation unit 31 sets a pixel position of a target pixel to (x,y).

In step S3, the multi-viewpoint image generation unit 31 initializes a counter n (not shown) to 0, and the counter n is used to manage a viewpoint position.

In step S4, the multi-viewpoint image generation unit 31 determines whether or not the counter n is 0, and, for example, since the counter n is 0 at the beginning of the process, the process proceeds to step S5.

In step S5, the multi-viewpoint image generation unit 31 outputs an image signal of the target pixel of the input signal as the fifth viewpoint output signal without modification, and the process proceeds to step S13.

In step S13, the multi-viewpoint image generation unit 31 increments the counter n (not shown) by one (1), and the process returns to step S4.

In addition, in step S4, for example, if the counter n is not 0, the process proceeds to step S6.

In step S6, the multi-viewpoint image generation unit 31 controls an n-th filter corresponding to the counter n among from the first filter 51 to the fourth filter 54 such that a feature amount signal is generated from the signal of the target pixel of the input image through a filter process using the above-described filter coefficient. The multi-viewpoint image generation unit 31 supplies the feature amount signal generated by the n-th filter to a corresponding nonlinear transformation portion (60+n) among the nonlinear transformation portions 61 to 64.

In step S7, the multi-viewpoint image generation unit 31 controls the nonlinear transformation portion (60+n) such that an enhancement signal is generated by performing a nonlinear transformation process for the feature amount signal and then the generated enhancement signal is supplied to an adder (70+n) and a subtractor (79−n).

In step S8, the multi-viewpoint image generation unit 31 controls the adder (70+n) such that an n-th viewpoint output signal is generated by adding the enhancement signal to the input image. In other words, through this process, the first viewpoint output signal to the fourth viewpoint output signal are sequentially generated according to a value of the counter n.

In step S9, the adder (70+n) outputs the generated n-th viewpoint output signal.

In step S10, the multi-viewpoint image generation unit 31 controls the subtractor (79−n) such that a (10−n)-th viewpoint output signal is output by subtracting the enhancement signal from the input image. In other words, through this process, the ninth output signal to the sixth viewpoint output signal are sequentially generated according to a value of the counter n.

In step S11, the subtractor (79-n) outputs the generated (10-n)-th viewpoint output signal.

In step S12, the multi-viewpoint image generation unit 31 determines whether or not the counter n is 4, that is, all the viewpoint output signals are generated, and, if all the viewpoint output signals are not generated, then the process proceeds to step S13. That is to say, the processes in steps S4, and S6 to S13 are repeatedly performed until all the viewpoint output signals are generated. In addition, if, in step S12, it is determined that the counter n is 4 and all the viewpoint output signals are generated, then the process proceeds to step S14.

In step S14, the multi-viewpoint image generation unit 31 determines whether or not the counter x is equal to $x_{max}$, that is, a position is an end part of the image in the horizontal direction, and if the counter x is not equal to $x_{max}$, that is, the position is not an end part of the image in the horizontal direction, then the process proceeds to step S15.

In step S15, the multi-viewpoint image generation unit 31 increments the counter x by 1, and the process returns to step S2.

In addition, in step S14, if the counter x is equal to $x_{max}$, then the multi-viewpoint image generation unit 31 initializes the counter x to 0 in step S16, and the process proceeds to step S17.

In step S17, the multi-viewpoint image generation unit 31 determines whether or not the counter y is equal to $y_{max}$, that is, a position is an end part of the image in the vertical direction, and if the counter x is not equal to $y_{max}$, that is, the position is not an end part of the image in the vertical direction, then the counter y is incremented by 1 in step S18, and the process returns to step S2.

In addition, in step S17, if it is determined that the counter y is equal to $y_{max}$ and the process for the entire image is completed, then the process finishes.

With the above-described process, multi-viewpoint images formed from the first viewpoint image to the ninth viewpoint image are generated. In addition, although the example where the multi-viewpoint image generation unit 31 of FIG. 3 generates multi-viewpoint images corresponding to the nine kinds of viewpoints has been described, there may be a configuration where multi-viewpoint images corresponding to a different number of the kinds are generated by increasing or decreasing the respective number of filters, nonlinear transformation portions, adders and subtractors which respectively correspond to the first filter 51 to the fourth filter 54, the nonlinear transformation portions 61 to 64, the adders 71 to 74, and the subtractors 75 to 78. Furthermore, in the first viewpoint image to the ninth viewpoint image, if a signal difference between adjacent viewpoints is equal to a predetermined value, and, as long as two viewpoint images have a value which is equal to twice the predetermined value, that is, for example, the above-described [-2u,0,2u], then any two images respectively form a left eye output signal and a right eye output signal. As a result, it is possible to realize naked-eye three-dimensional stereoscopic vision even at a plurality of viewpoints.

[Influence of Crosstalk of Multi-Viewpoint Images Generated by Multi-Viewpoint Image Generation Unit of FIG. 3]

Generally, in a multi-viewpoint display device, it is difficult to completely present only one viewpoint image to a viewer due to its structure, and it may not be avoid that images of viewpoint images (hereinafter, referred to as "adjacent viewpoint images") at both sides of a specific viewpoint are viewed simultaneously at a given ratio. This phenomenon is referred to as crosstalk, similar to leakage of an audio signal.

Here, referring to FIG. 7, a description will be made of a signal difference between viewpoints in a case where there is crosstalk from adjacent viewpoints of multi-viewpoint images generated by the multi-viewpoint image generation unit 31 of FIG. 3.

Figure 7:
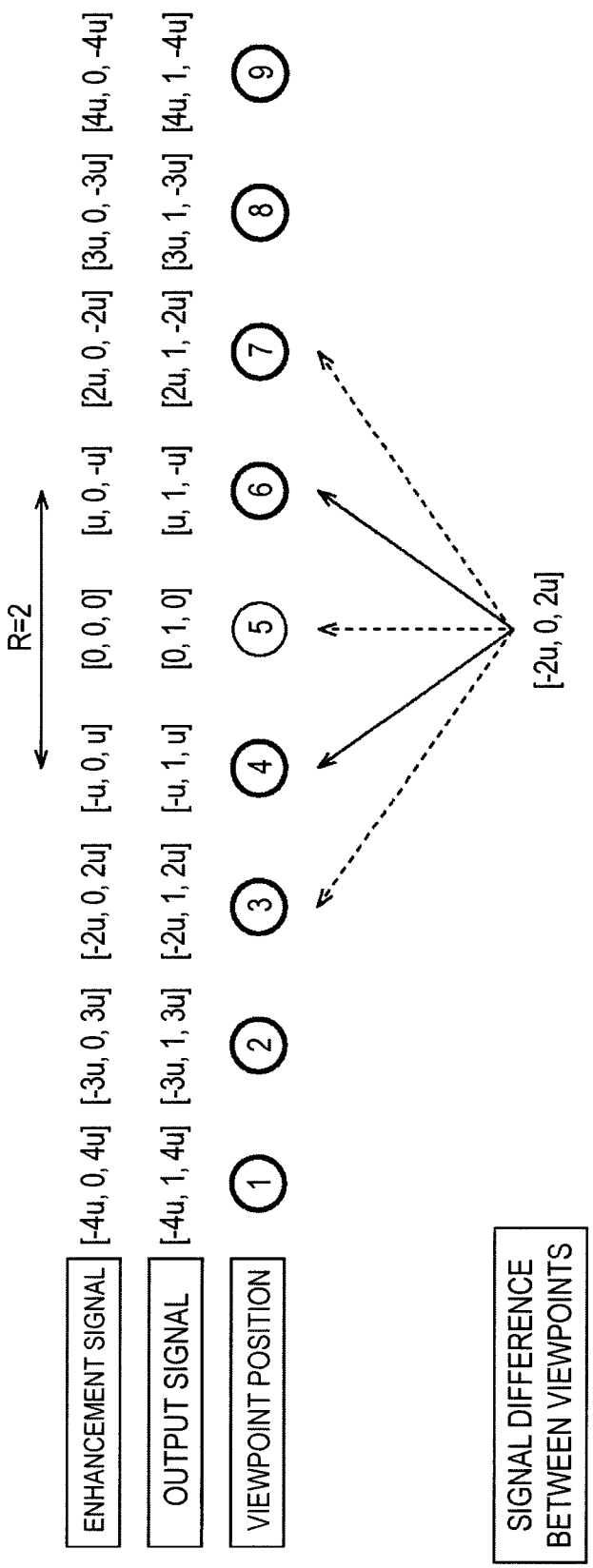
FIG. 7 is a diagram illustrating crosstalk caused by multi-viewpoint images generated by the multi-viewpoint image generation unit of FIG. 3.

As shown in FIG. 7, in addition to the fourth viewpoint output signal which is an image to be originally presented to a viewer as a left eye image, the third viewpoint output signal and the fifth viewpoint output signal which are adjacent viewpoint images are typically in a state of being presented to the left eye at a given ratio.

Further, in addition to the sixth viewpoint output signal which is an image to be originally presented to a viewer as a right eye image, the fifth viewpoint output signal and the seventh viewpoint output signal which are adjacent viewpoint images are being presented to the right eye at a given ratio.

If a ratio of adjacent viewpoint images to an image to be originally presented is p, in FIG. 7, at the viewpoint 5, a difference D_ab between viewpoints which is a difference between an output signal C_a' presented to the left eye as an image of a left eye viewpoint a and an output signal C_b' presented to the right eye as an image of a right eye viewpoint b is obtained as shown in the following Equation (29).

$$D\_ab = C\_a' - C\_b' \tag{29}$$

Here, the output signals C_a' and C_b' at the respective viewpoints a and b may be replaced as shown in the following Equations (30) and (31), respectively.

$$C\_a' = p \times C\_a-1 + (1-2 \times p) \times C\_a + p \times C\_a+1 \tag{30}$$

$$C\_b' = p \times C\_b-1 + (1-2 \times p) \times C\_b + p \times C\_b+1 \tag{31}$$

In addition, since the distance R between viewpoints is 2, a relationship between the viewpoints a and b is given by the following Equation (32).

$$b = a + R = a + 2 \tag{32}$$

By using this relationship, Equation (31) may be rewritten as the following Equation (33).

$$C\_b' = p \times C\_a+1 + (1-2 \times p) \times C\_a+2 + p \times C\_a+3 \tag{33}$$

Therefore, the signal difference D_ab between viewpoints where the influence of crosstalk is taken into consideration is expressed by the following Equation (34).

$$\begin{aligned} D\_ab = &\{p \times C\_a-1 + (1-2 \times p) \times C\_a + p \times C\_a+1\} - \\ &\{p \times C\_a+1 + (1-2 \times p) \times C\_a+2 + p \times C\_a+3\} = \\ &p \times (C\_a-1 - C\_a+1) + (C\_a - C\_a+2) - \\ &2 \times p \times (C\_a - C\_a+2) + p \times (C\_a+1 - C\_a+3) = \\ &(p + 1 - 2 \times p + p) \times [-2u, 0, 2u] \\ &(\because C\_a-1 - C\_a+1 = C\_a - C\_a+2 = \\ &C\_a+1 - C\_a+3 = [-2u, 0, 2u]) = [-2u, 0, 2u] \end{aligned} \tag{34}$$

As shown in Equation (34), the signal difference D_ab between viewpoints is a value which does not depend on the ratio p of crosstalk. In other words, the multi-viewpoint images generated by the multi-viewpoint image generation unit 31 of FIG. 3 can typically maintain a constant signal difference between viewpoints regardless of an amount or a position of crosstalk occurring between adjacent viewpoints, and thus it is possible to typically realize optimal three-dimensional stereoscopic vision.

2. Second Embodiment

Configuration Example of Multi-Viewpoint Image Generation Unit Using Enhancement Signal in Previous Target Pixel Although the configuration example of a case where a filter coefficient sequence forms odd symmetry with respect to a central coefficient value has been described in the above description, three-dimensional stereoscopic vision can be realized by considering a configuration of coefficient values even in a case where the filter coefficient sequence does not form odd symmetry with respect to the central coefficient value.

Figure 8:
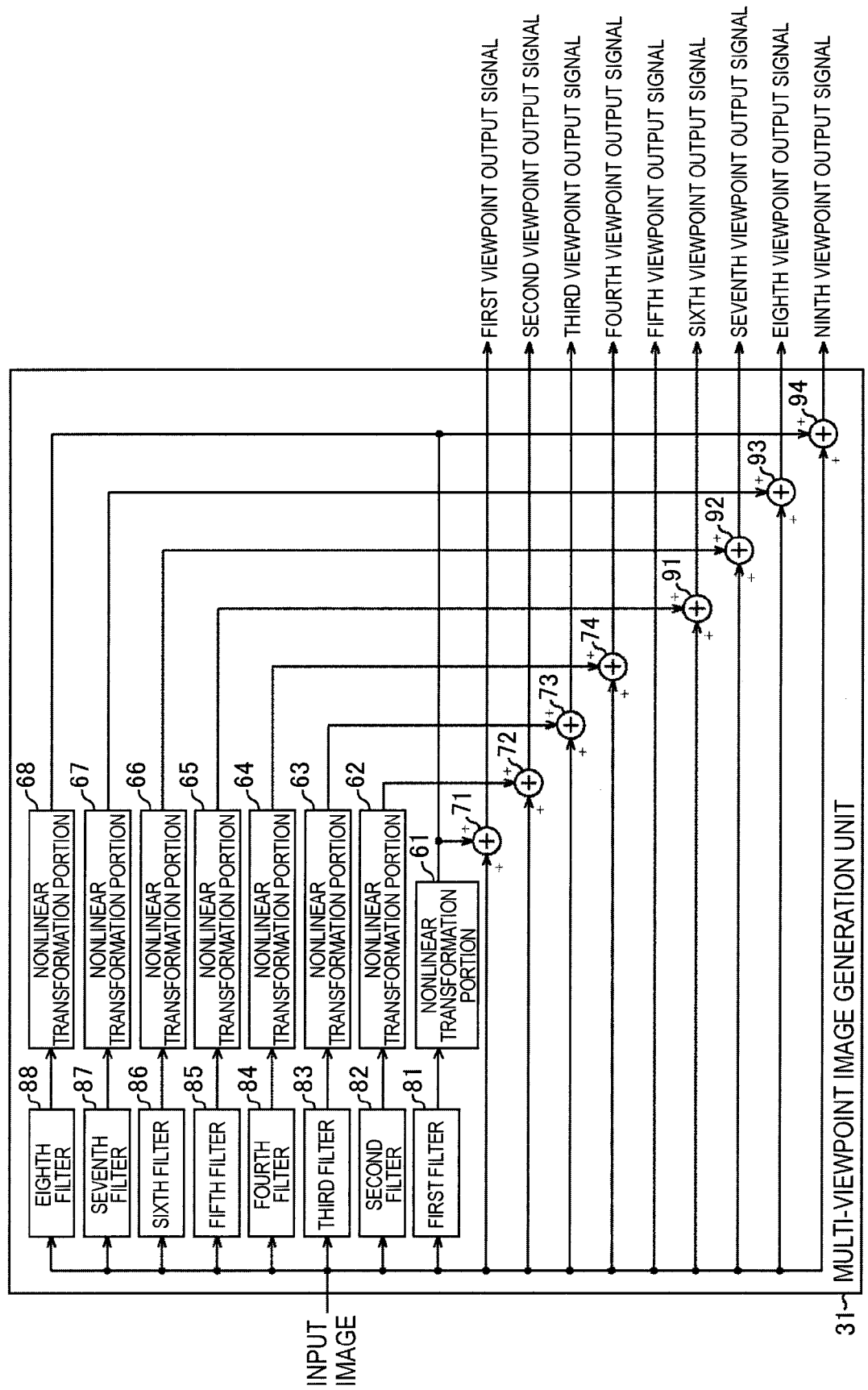
FIG. 8 is a diagram illustrating a configuration example of the multi-viewpoint image generation unit of the image processing apparatus according to a second embodiment of the present disclosure.

FIG. 8 shows a configuration example of the multi-viewpoint image generation unit 31 in a case where a filter coefficient sequence does not form odd symmetry with respect to a central coefficient value. In addition, in the multi-viewpoint image generation unit 31 of FIG. 8, constituent elements having the same function as the constituent elements of the multi-viewpoint image generation unit 31 of FIG. 3 are given the same reference numerals, and description thereof will be appropriately omitted.

In other words, the multi-viewpoint image generation unit 31 of FIG. 8 is different from the multi-viewpoint image generation unit 31 of FIG. 3 in that a first filter 81 to an fourth filter 84 and adders 91 to 94 are provided instead of the first filter 51 to the fourth filter 54 and the subtractors 75 to 78.

The first filter 81 to the fourth filter 84 fundamentally have similar function as the first filter 51 to the fourth filter 54, but their respective filter coefficients are different from each other.

The adders 91 to 94 have the same function as the adders 71 to 74.

[Filter Coefficients of First to Fourth Filters of Multi-Viewpoint Image Generation Unit of FIG. 8]

Figure 9:
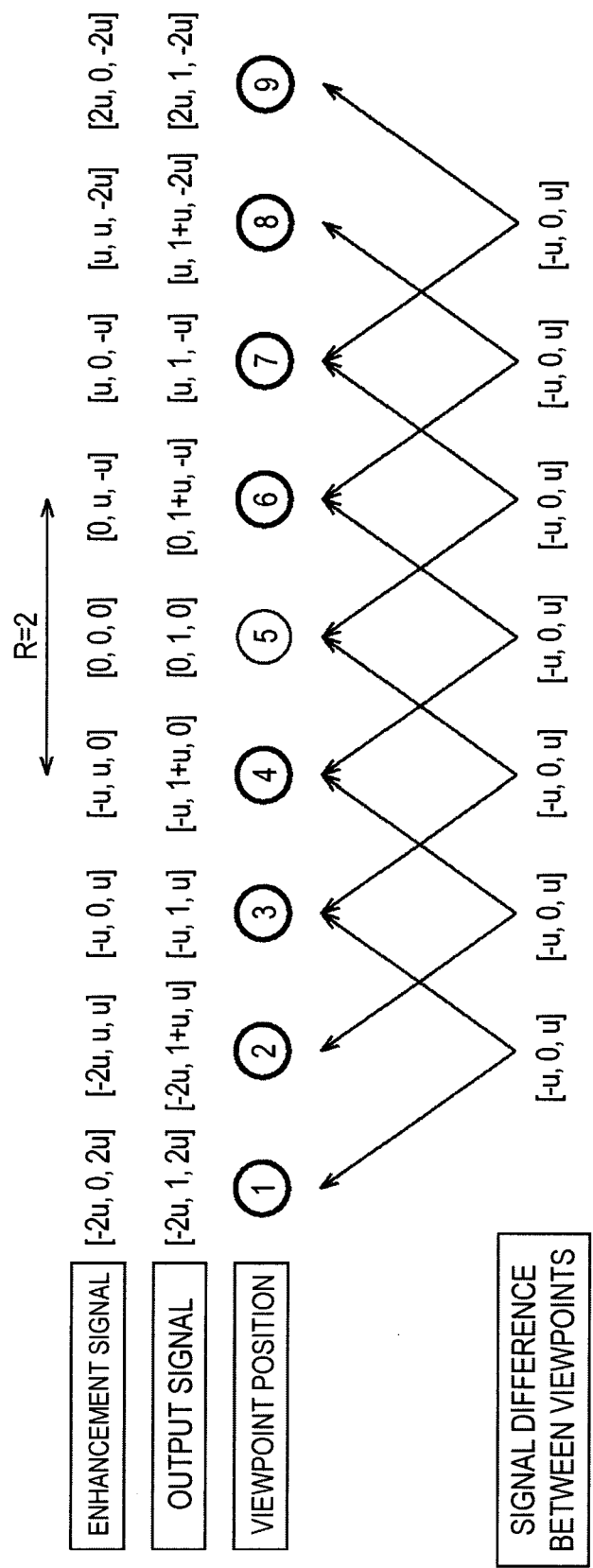
FIG. 9 is a diagram illustrating a multi-viewpoint image generation process performed by the multi-viewpoint image generation unit of FIG. 8.

As shown in FIG. 9, for example, in a case where the first filter 81 generating feature amount signals of the viewpoints 4 to 6 uses a 3-tap FIR filter having a tap coefficient $[-1,1,0]$ as a filter coefficient, and the outputs by nonlinear transformation are u, 2u, 3u, 4u, ... when inputs are 1, 2, 3, 4, ..., the output signals $C\_4$ to $C\_6$ at the viewpoints 4 to 6 for the unit input 1 are expressed by the following Equations (35) to (37).

$$C\_4=[-u,1+u,0] \tag{35}$$

$$C\_5=[0,1,0] \tag{36}$$

$$C\_6=[0,1+u,-u] \tag{37}$$

Therefore, filter coefficients which generate output signals $C\_1$ to $C\_3$ and $C\_7$ to $C\_9$ at the viewpoints 1 to 3 and viewpoints 7 to 9, respectively are obtained according to the following procedures.

In other words, a difference $D\_46$ between the output signal at the viewpoint 4 and the output signal at the viewpoint 6 is equal to a difference between the output signal $C\_4$ at the viewpoint 4 and the output signal $C\_6$ at the viewpoint 6, and thus the difference $D\_46$ is expressed as shown in the following Equation (38).

$$D\_46=C\_4-C\_6=[-u,1+u,0]-[0,1+u,-u]=[-u,0,u] \tag{38}$$

A difference $D\_35$ between the output signal $C\_3$ at the viewpoint 3 and the output signal $C\_5$ at the viewpoint 5 is equal to the difference $D46$ on the basis of the constraint condition, and thus a relationship of the following Equation (39) is established.

$$D\_35=C\_3-C\_5=D\_46 \tag{39}$$

If Equation (39) is rewritten as the following Equation (40), then the output signal $C\_3$ at the viewpoint 3 is obtained.

$$C\_3=D\_46+C\_5=[-u,0,u]+[0,1,0]=[-u,1,u] \tag{40}$$

In addition, a difference $D\_24$ between the output signal $C\_2$ at the viewpoint 2 and the output signal $C\_4$ at the viewpoint 4 is equal to the difference $D\_46$ on the basis of the constraint condition, and thus a relationship of the following Equation (41) is established.

$$D\_24=C\_2-C\_4=D\_46 \tag{41}$$

If Equation (41) is rewritten as the following Equation (42), then the output signal $C\_2$ at the viewpoint 2 is obtained.

$$C\_2=D\_46+C\_4=[-u,0,u]+[-u,1+u,0]=[-2u,1+u,u] \tag{42}$$

In addition, a difference $D\_13$ between the output signal $C\_1$ at the viewpoint 1 and the output signal $C\_3$ at the viewpoint 3 is equal to the difference $D\_46$ on the basis of the constraint condition, and thus a relationship of the following Equation (43) is established.

$$D\_13=C\_1-C\_3=D\_46 \tag{43}$$

If Equation (43) is rewritten as the following Equation (44), then the output signal $C\_1$ at the viewpoint 1 is obtained.

$$C\_1=D\_46+C\_3=[-u,0,u]+[-u,1,u]=[-2u,1,2u] \tag{44}$$

In addition, a difference $D\_57$ between the output signal $C\_5$ at the viewpoint 5 and the output signal $C\_7$ at the viewpoint 7 is equal to the difference $D\_46$ on the basis of the constraint condition, and thus a relationship of the following Equation (45) is established.

$$D\_57=C\_5-C\_7=D\_46 \tag{45}$$

If Equation (45) is rewritten as the following Equation (46), then the output signal $C\_7$ at the viewpoint 7 is obtained.

$$C\_7=C\_5-D\_46=[0,1,0]-[-u,0,u]=[u,1,-u] \tag{46}$$

In addition, a difference $D\_68$ between the output signal $C\_6$ at the viewpoint 6 and the output signal $C\_8$ at the viewpoint 8 is equal to the difference $D\_46$ on the basis of the constraint condition, and thus a relationship of the following Equation (47) is established.

$$D\_68=C\_6-C\_8=D\_46 \tag{47}$$

If Equation (47) is rewritten as the following Equation (48), then the output signal $C\_8$ at the viewpoint 8 is obtained.

$$C\_8=C\_6-D\_46=[0,1+u,-u]-[-u,0,u]= [u,1+u,-2u] \tag{48}$$

In addition, a difference $D\_79$ between the output signal $C\_7$ at the viewpoint 7 and the output signal $C\_9$ at the viewpoint 9 is equal to the difference $D46$ on the basis of the constraint condition, and thus a relationship of the following Equation (49) is established.

$$D\_79=C\_7-C\_9=D\_46 \tag{49}$$

If Equation (49) is rewritten as the following Equation (50), then the output signal $C\_9$ at the viewpoint 9 is obtained.

$$C\_9=C\_7-D\_46=[u,1,-u]-[-u,0,u]=[2u,1,-2u] \tag{50}$$

Nonlinear transformation related to the nonlinear transformation portions 61 to 64 has similar relationship as in Equations (17) to (24) described above.

For this reason, filter coefficients of the first filter 81 to the fourth filter 84 are obtained as in the following Equations (51) to (54).

$$\text{Filter coefficient of the first filter } 81=[-2,0,2] \tag{51}$$

$$\text{Filter coefficient of the second filter } 82=[-2,1,1] \tag{52}$$

Filter coefficient of the third filter 83=[−1,0,1]  (53)

Filter coefficient of the fourth filter 84=[−1,1,0]  (54)

In addition, filter coefficients of the fifth filter 85 to the eighth filter 88 can be also obtained using similar method as the method for obtaining the filter coefficients of the first filter 81 to the fourth filter 84, and are thus obtained as in the following Equations (55) to (58).

Filter coefficient of the fifth filter 85=[0,1,−1]  (55)

Filter coefficient of the sixth filter 86=[1,0,−1]  (56)

Filter coefficient of the seventh filter 87=[1,1,−2]  (57)

Filter coefficient of the eighth filter 88=[2,0,−2]  (58)

As described above, by setting filter coefficients such that a signal difference between viewpoints is typically constant, it is possible to generate multi-viewpoint images where optimal naked-eye three-dimensional stereoscopic vision is possible at any time and at any viewpoint. As a result, it is possible to realize naked-eye three-dimensional stereoscopic vision even at a plurality of viewpoints. In addition, needless to say, the filter coefficients may be other filter coefficients as long as the constraint condition set by a distance between adjacent viewpoints is satisfied.

[Multi-Viewpoint Image Generation Process Performed by Multi-Viewpoint Image Generation Unit of FIG. 8]

Figure 10:
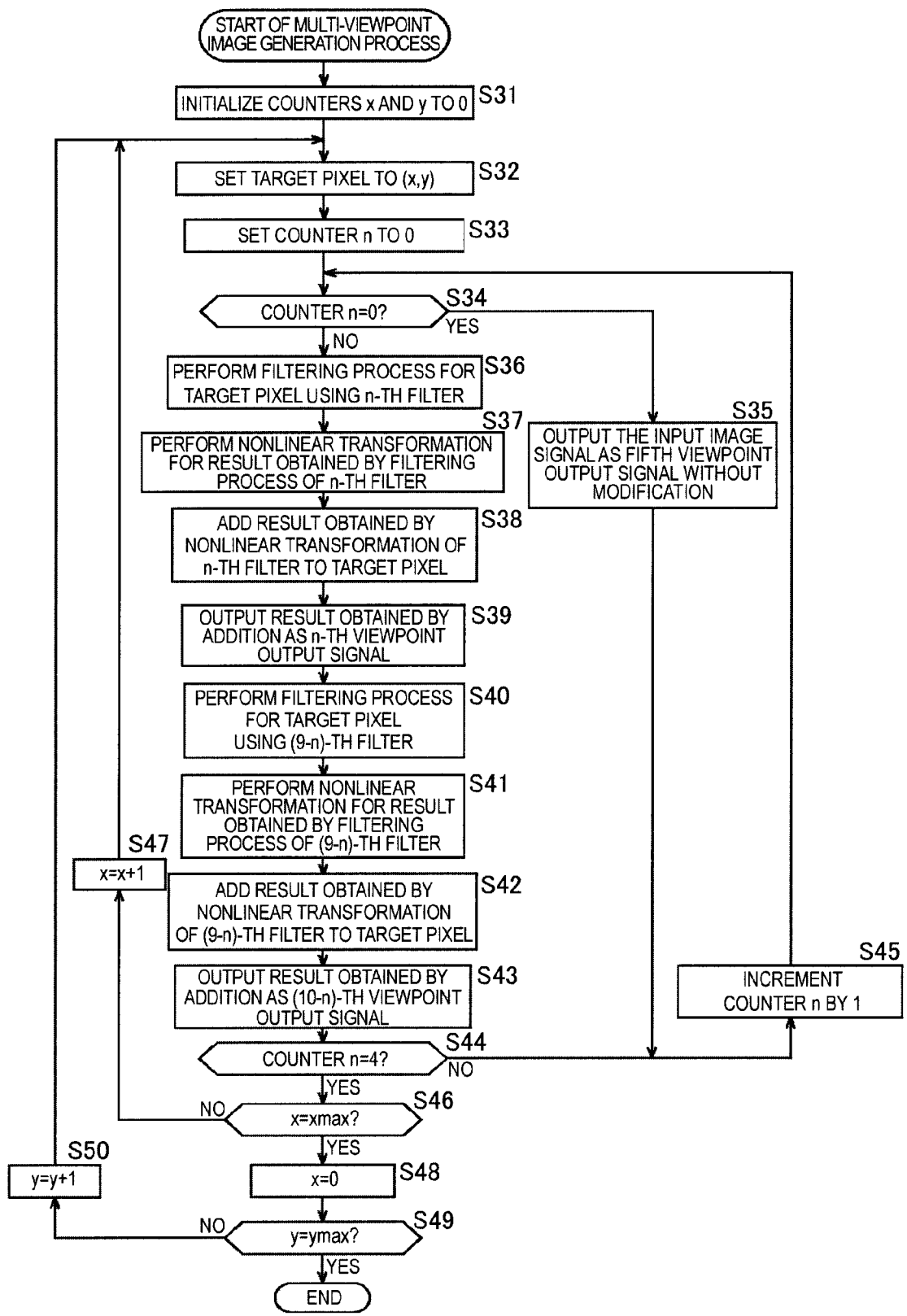
FIG. 10 is a flowchart illustrating a multi-viewpoint image generation process performed by the multi-viewpoint image generation unit of FIG. 8.

Next, a multi-viewpoint image generation process performed by the multi-viewpoint image generation unit 31 of FIG. 8 will be described with reference to a flowchart of FIG. 10. Further, processes in steps S31 to S49 excluding processes in steps S40 to S42 in the flowchart of FIG. 10 are similar as the processes in steps S1 to S18 excluding the process in step S10, described with reference to the flowchart of FIG. 6, and thus description thereof will be omitted.

In other words, in step S40, the multi-viewpoint image generation unit 31 controls a (9−n)-th filter corresponding to the counter n among from the first filter 81 to the eighth filter 88 such that a feature amount signal is generated from the signal of the target pixel of the input image through a filter process using the above-described filter coefficient. The multi-viewpoint image generation unit 31 supplies the feature amount signal generated by the (9−n)-th filter to a corresponding nonlinear transformation portion (69−n) among the nonlinear transformation portions 61 to 68.

In step S41, the multi-viewpoint image generation unit 31 controls the nonlinear transformation portion (69−n) such that an enhancement signal is generated by performing a nonlinear transformation process for the feature amount signal and the generated enhancement signal is supplied to an adder (95−n).

In step S42, the multi-viewpoint image generation unit 31 controls the adder (95−n) such that a (10−n)-th viewpoint output signal is generated by adding the enhancement signal to the input image. In other words, through this process, the ninth viewpoint output signal to the sixth viewpoint output signal are sequentially generated according to a value of the counter n.

With the above-described process, the multi-viewpoint images are generated. In addition, although the example where the multi-viewpoint image generation unit 31 of FIG. 8 generates multi-viewpoint images corresponding to the nine kinds of viewpoints has been described, there may be a configuration where multi-viewpoint images corresponding to a different number of the kinds are generated by increasing or decreasing the respective number of filters, nonlinear transformation portions, and adders which respectively correspond to the first filter 81 to the eighth filter 88, the nonlinear transformation portions 61 to 68, the adders 71 to 74, and the adders 91 to 94. In addition, in the first viewpoint image to the ninth viewpoint image, if a signal difference between adjacent viewpoints is equal to a predetermined value, and, as long as two viewpoint images have a value which is equal to twice the predetermined value, that is, for example, the above-described [−u,0,u], then any two images respectively form a left eye output signal and a right eye output signal. As a result, it is possible to realize naked-eye three-dimensional stereoscopic vision even at a plurality of viewpoints. In addition, in a case of sequentially performing a process in units of pixels adjacent in the horizontal direction, when a pixel located at a leading position or a last position in the horizontal direction becomes a target pixel, since a previous target pixel or a next target pixel is not an adjacent pixel, the previous target pixel or the next target pixel may be also treated as the present target pixel when the pixel located at the leading position or the last position in the horizontal direction becomes a target pixel.

[Influence of Crosstalk of Multi-Viewpoint Images Generated by Multi-Viewpoint Image Generation Unit of FIG. 8]

Figure 11:
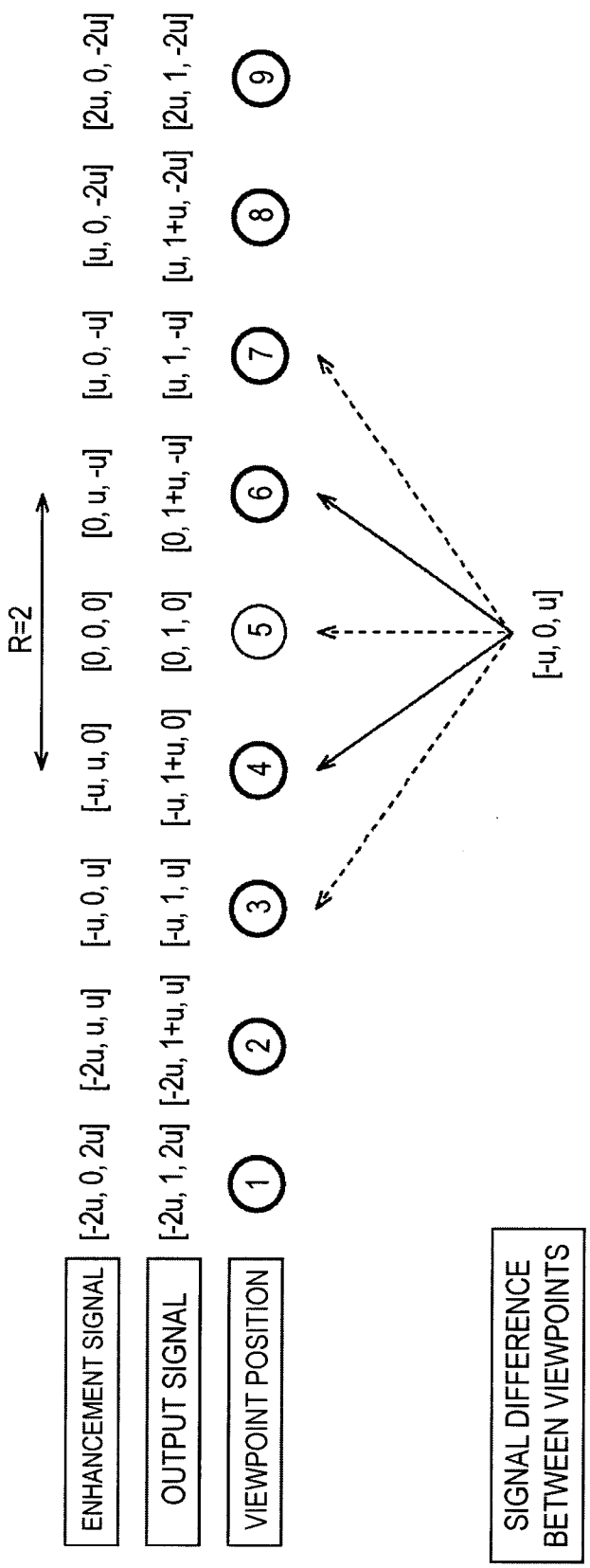
FIG. 11 is a diagram illustrating crosstalk caused by multi-viewpoint images generated by the multi-viewpoint image generation unit of FIG. 8.

Here, referring to FIG. 11, a description will be made of a signal difference between viewpoints in a case where there is crosstalk from adjacent viewpoints of multi-viewpoint images generated by the multi-viewpoint image generation unit 31 of FIG. 8. Crosstalk between adjacent viewpoints is obtained from Equation (34) described above. By substituting the filter coefficients of the first filter 81 to the fourth filter 84 of the multi-viewpoint image generation unit 31 of FIG. 8 for Equation (34), the signal difference D_ab between viewpoints where the crosstalk between adjacent viewpoints obtained by the multi-viewpoint image generation unit 31 of FIG. 8 is taken into consideration is obtained as the following Equation (59).

$$\begin{aligned} D\_ab = &\{p \times C\_a-1 + (1-2\times p)\times C\_a + p\times C\_a+1\} - \\ &\{p\times C\_a+1 + (1-2\times p)\times C\_a+2 + p\times C\_a+3\} = \\ &p\times (C\_a-1 - C\_a+1) + (C\_a - C\_a+2) - \\ &2\times p\times (C\_a - C\_a+2) + p\times (C\_a+1 - C\_a+3) = \\ &(p+1-2\times p+p)\times [-u, 0, u] \\ &(\because C\_a-1 - C\_a+1 = C\_a - C\_a+2 = \\ &C\_a+1 - C\_a+3 = [-u, 0, u]) = [-u, 0, u] \end{aligned} \quad (59)$$

As shown in Equation (59), the difference D_ab between viewpoints becomes a value which does not depend on the ratio p of crosstalk. In other words, the multi-viewpoint images generated by the multi-viewpoint image generation unit 31 of FIG. 8 can normally maintain a constant signal difference between viewpoints regardless of an amount or a position of crosstalk occurring between adjacent viewpoints, and thus it is possible to typically realize optimal three-dimensional stereoscopic vision.

As described above, in the embodiments of the present disclosure, it is possible to generate multi-viewpoint images appropriate for stereoscopic vision with a simple process and to typically realize optimal three-dimensional stereoscopic vision without depending on amount of crosstalk occurring when displaying multi-viewpoint images.

The above-described series of processes may be performed by hardware or may be performed in software. When a series of processes is performed in the software, programs constituting the software are installed from a recording medium to a computer incorporated in dedicated hardware, or, for example, a general purpose personal computer which can execute various kinds of functions by installing various kinds of programs.

Figure 12:
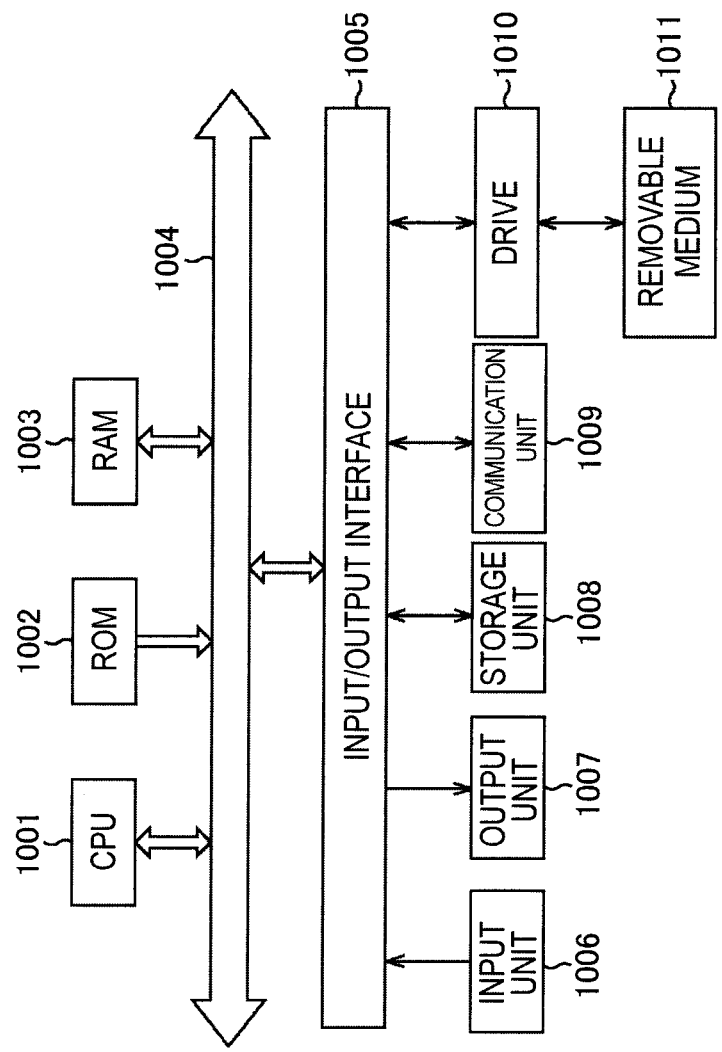
FIG. 12 is a diagram illustrating a configuration example of the general purpose personal computer.

FIG. 12 shows a configuration example of the general purpose personal computer. The personal computer has a CPU (Central Processing Unit) 1001 embedded therein. The CPU 1001 is connected to an input/output interface 1005 via a bus 1004. The bus 1004 is connected to a ROM (Read Only Memory) 1002 and a RAM (Random Access Memory) 1003.

The input/output interface 1005 is connected to an input unit 1006, an output unit 1007, a storage unit 1008, and a communication unit 1009. The input unit 1006 includes input devices such as a keyboard and a mouse with which a user inputs operation commands. The output unit 1007 outputs a process operation screen or an image of a process result to a display device. The storage unit 1008 includes a hard disk drive which stores programs or a variety of data. The communication unit 1009 includes a LAN (Local Area Network) adaptor or the like and performing a communication process via a network represented by the Internet. In addition, the input/output interface 1005 is connected to a drive 1010 which reads and writes data from and in a removable medium 1011 such as magnetic disks (including flexible disks), optical discs (including CD-ROMs (Compact Disc-Read Only Memories) and DVDs (Digital Versatile Discs)), magneto-optical discs (including MDs (Mini-Discs)), or semiconductor memories.

The CPU 1001 executes a variety of processes according to a program stored in the ROM 1002, or a program which is read from the removable medium 1011 such as a magnetic disk, an optical disc, a magneto-optical disc, or a semiconductor memory, is installed in the storage unit 1008, and is loaded to the RAM 1003 from the storage unit 1008. The RAM 1003 appropriately also stores data or the like which is necessary for the CPU 1001 to execute a variety of processes.

Further, in this specification, the steps of describing programs recorded on a recording medium include not only processes performed in a time series according to the described order, but also processes performed in parallel or separately even if not necessarily performed in the time series.

Additionally, the present technology may also be configured as below.

(1) An image processing apparatus including:
a plurality of extraction units that extract a plurality of spatial feature amount signals of an input image signal formed by a two-dimensional image signal;
a plurality of enhancement processing units that generate a plurality of enhancement signals by performing an enhancement process for each of the plurality of feature amount signals; and
a plurality of first image generation units that generate a first viewpoint image for each of the plurality of enhancement signals by adding the plurality of enhancement signals to the input image signal,
wherein the plurality of extraction units extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

(2) The image processing apparatus according to (1), further including:
a plurality of second image generation units that generate a second viewpoint image for each of the plurality of enhancement signals by subtracting the plurality of enhancement signals from the input image signal,
wherein the plurality of extraction units extract a plurality of spatial feature amounts of the input image signal formed by a two-dimensional image signal such that a signal difference between viewpoints of viewpoint images which are obtained in order of magnitude of addition values of the enhancement signals added to or subtracted from the input image signal is a predetermined value, and both of two viewpoint images where the signal difference between viewpoints is equal to twice the predetermined value form a left eye image and a right eye image for realizing three-dimensional stereoscopic vision.

(3) The image processing apparatus according to (1) or (2),
wherein, when the input image signal is sequentially supplied in units of pixels consecutively adjacent in a predetermined direction, the first image generation units generate the first viewpoint image by adding the enhancement signal to the input image signal of a present pixel, and the second image generation units generate the second viewpoint image by subtracting the enhancement signal from the input image signal of a pixel processed immediately before the present pixel.

(4) An image processing method including:
extracting, by a plurality of extraction units that extract a spatial feature amount signals of an input image signal formed by a two-dimensional image signal, the plurality of spatial feature amount signals of the input image signal formed by a two-dimensional image signal, the extracting being performed a plurality of times;
performing, by a plurality of enhancement processing units that generate a plurality of enhancement signals by performing an enhancement process for each of a plurality of feature amount signals, an enhancement process for each of the plurality of feature amount signals and generating the plurality of enhancement signals, the enhancement process being performed a plurality of times; and
generating, by a plurality of first image generation units that generate a first viewpoint image for each of the plurality of enhancement signals by adding the plurality of enhancement signals to the input image signal, the first viewpoint image for each of the plurality of enhancement signals by adding the plurality of enhancement signals to the input image signal, the generating being performed a plurality of times,
wherein the extracting is performed by causing the plurality of extraction units to extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

(5) A program enabling a computer to control an image processing apparatus including
a plurality of extraction units that extract a plurality of spatial feature amount signals of an input image signal formed by a two-dimensional image signal;

a plurality of enhancement processing units that perform an enhancement process for each of the plurality of feature amount signals and generate a plurality of enhancement signals; and a plurality of first image generation units that generate a first viewpoint image for each of the plurality of enhancement signals by adding the plurality of enhancement signals to the input image signal, wherein the plurality of extraction units extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision, and wherein the program enables the computer to execute operations including extracting, by the plurality of extraction units, the plurality of spatial feature amount signals of the input image signal formed by a two-dimensional image signal, the extracting being performed a plurality of times;

performing, by the plurality of enhancement processing units, the enhancement process for each of the plurality of feature amount signals and generating the plurality of enhancement signals, the enhancement process being performed a plurality of times; and generating, by the plurality of first image generation units, the first viewpoint image for each of the plurality of enhancement signals by adding the plurality of enhancement signals to the input image signal, the generating being performed a plurality of times, wherein the extracting is performed by causing the plurality of extraction units to extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-159485 filed in the Japan Patent Office on Jul. 21, 2011, the entire content of which is hereby incorporated by reference.

What is claimed is:

1. An image processing apparatus comprising:
a plurality of extraction units that extract a plurality of spatial feature amount signals of an input image signal formed by a two-dimensional image signal;
a plurality of enhancement processing units that generate a plurality of enhancement signals by performing an enhancement process for each of the plurality of feature amount signals; and
a plurality of first image generation units that generate a first viewpoint image for each of the plurality of enhancement signals by adding the plurality of enhancement signals to the input image signal, wherein the plurality of extraction units extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision, and wherein at least one of the plurality of extraction units, the plurality of enhancement processing units, and the plurality of first image generation units are implemented via a processor.

2. The image processing apparatus according to claim 1, further comprising:
a plurality of second image generation units that generate a second viewpoint image for each of the plurality of enhancement signals by subtracting the plurality of enhancement signals from the input image signal, wherein the plurality of extraction units extract a plurality of spatial feature amounts of the input image signal formed by a two-dimensional image signal such that a signal difference between viewpoints of viewpoint images which are obtained in order of magnitude of addition values of the enhancement signals added to or subtracted from the input image signal is a predetermined value, and both of two viewpoint images where the signal difference between viewpoints is equal to twice the predetermined value form a left eye image and a right eye image for realizing three-dimensional stereoscopic vision, and wherein the plurality of second image generation units are implemented via a processor.

3. The image processing apparatus according to claim 1, wherein, when the input image signal is sequentially supplied in units of pixels consecutively adjacent in a predetermined direction, the first image generation units generate the first viewpoint image by adding the enhancement signal to the input image signal of a present pixel.

4. An image processing method comprising:
extracting, by a plurality of extraction units that extract a spatial feature amount signals of an input image signal formed by a two-dimensional image signal, the plurality of spatial feature amount signals of the input image signal formed by a two-dimensional image signal, the extracting being performed a plurality of times;
performing, by a plurality of enhancement processing units that generate a plurality of enhancement signals by performing an enhancement process for each of a plurality of feature amount signals, an enhancement process for each of the plurality of feature amount signals and generating the plurality of enhancement signals, the enhancement process being performed a plurality of times; and
generating, by a plurality of first image generation units that generate a first viewpoint image for each of the plurality of enhancement signals by adding the plurality of enhancement signals to the input image signal, the first viewpoint image for each of the plurality of enhancement signals by adding the plurality of enhancement signals to the input image signal, the generating being performed a plurality of times, wherein the extracting is performed by causing the plurality of extraction units to extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision, and wherein at least one of the plurality of extraction units, the plurality of enhancement processing units, and the plurality of first image generation units are implemented via a processor.

5. A non-transitory computer-readable medium encoded with a computer program enabling a computer to control an image processing apparatus including a plurality of extraction units that extract a plurality of spatial feature amount signals of an input image signal formed by a two-dimensional image signal;

a plurality of enhancement processing units that perform an enhancement process for each of the plurality of feature amount signals and generate a plurality of enhancement signals; and a plurality of first image generation units that generate a first viewpoint image for each of the plurality of enhancement signals by adding the plurality of enhancement signals to the input image signal, wherein the plurality of extraction units extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision, and wherein the program enables the computer to execute operations including extracting, by the plurality of extraction units, the plurality of spatial feature amount signals of the input image signal formed by a two-dimensional image signal, the extracting being performed a plurality of times;

performing, by the plurality of enhancement processing units, the enhancement process for each of the plurality of feature amount signals and generating the plurality of enhancement signals, the enhancement process being performed a plurality of times; and generating, by the plurality of first image generation units, the first viewpoint image for each of the plurality of enhancement signals by adding the plurality of enhancement signals to the input image signal, the generating being performed a plurality of times, wherein the extracting is performed by causing the plurality of extraction units to extract a plurality of spatial feature amounts of the input image signal formed by a two-dimensional image signal such that a signal difference between viewpoints of viewpoint images which are obtained in order of magnitude of addition values of the enhancement signals added to the input image signal is a predetermined value, and both of two viewpoint images where the signal difference between viewpoints is equal to twice the predetermined value form a left eye image and a right eye image for realizing three-dimensional stereoscopic vision.

* * * * *